Patented Oct. 7, 1930

1,777,617

UNITED STATES PATENT OFFICE

JOHN ANDREW JACK, OF LETCHWORTH, ENGLAND

PROCESS AND APPARATUS FOR REFINING INDUSTRIAL METALS IN THE MOLTEN STATE

No Drawing. Application filed March 31, 1928, Serial No. 266,464, and in Great Britain March 6, 1928.

This invention relates to improvements in apparatus used in the refining of industrial metals in the molten state, and it refers especially to refractory materials for use in operations where molten metals are treated with alkaline or alkaline earth oxides, hydroxides or carbonates.

It is generally known that when molten iron or steel is treated with certain oxides, hydroxides or carbonates of the alkalis or alkaline earths, silicon and sulphur are wholly or partly removed from the iron or steel according to the nature and quantity of the agent and the conditions under which the treatment is applied. If, for example, molten iron or steel is treated with a suitable amount of sodium carbonate under suitable conditions, considerable portions of the silicon and sulphur originally present in the metal enter into combination with the sodium radical forming a slag of relatively low specific gravity. This slag rises to the surface of the molten metal and can be removed by skimming or other suitable method.

Although this method for the control of sulphur and silicon in metals has been generally known, it has hitherto been incapable of economical industrial application on account of the fact that under the conditions of the treatment the alkaline reagent used enters into combination with the siliceous portion of the refractory material used for lining the ladle or other container in which the treatment is applied. The effect of this combination is that the refractory lining rapidly disappears as molten slag, and the cost of repeatedly re-lining the container renders the method uneconomical.

According to the present invention the alkaline treatment of the molten metal is effected in a ladle or container lined with refractory material comprising 90% by weight of silica such as ganister with which carbon has been incorporated. Experiments show that the admixture of graphite, plumbago or some other suitable form of carbon to such refractory material results in an increased life of the lining of between seven and fiftyfold that of a similar lining containing no added carbon, whereby the cost of re-lining is reduced to such an extent as to make the purifying operation already described capable of economical industrial application.

The percentage of carbon added may be between 5% and 25% of the weight of the refractory material and the addition may be made by intimately mixing the necessary quantities of carbon and the refractory material while both are in the powdered state.

By way of example, 90 parts of ganister clay or other suitable refractory material comprising 90% by weight of silica such as ganister may be mixed with 10 parts by weight of powdered graphite, the mixing being effected in any suitable type of apparatus. With this mixture may be incorporated a sufficient quantity of water so that a paste or dough of a consistency suitable for subsequent manipulation is produced.

The mixture prepared as described may then be applied to the ladle or other container in which the alkaline treatment already described is to be applied. This may be effected, for example, by means of a suitably designed plug which can be used as a mould for the lining, the prepared mixture being rammed into the space between the plug and the container.

Alternatively, the mixture prepared as described may be cast or moulded into suitable shapes and baked or fired so as to produce a rigid article which can be used for building up a lining. In this case joints are made by means of the mixture as described in the state of a paste or dough.

What I claim is:—

1. A container for holding molten industrial metals during the alkaline treatment thereof, which is lined with ganister intimately mixed with 5% to 25% by weight of carbon.

2. A container for holding molten industrial metal during the alkaline treatment thereof which is lined with a substance comprising 90% or more by weight of silica intimately mixed with 5% to 25% by weight of carbon.

In testimony that I claim the foregoing as my invention I have signed my name this 16th day of March, 1928.

JOHN ANDREW JACK.